(12) United States Patent
Fellows et al.

(10) Patent No.: US 8,047,359 B2
(45) Date of Patent: Nov. 1, 2011

(54) REDUCED NOISE CONTAINER CARRIER

(75) Inventors: Eugene E. Fellows, Nokomis, FL (US); Lawrence C. Hardy, Cresco, PA (US)

(73) Assignee: Integration and Automation Solutions, Inc., Allentown, PA (US)

( * ) Notice: Subject to any disclaimer, the term of this patent is extended or adjusted under 35 U.S.C. 154(b) by 366 days.

(21) Appl. No.: 12/454,671

(22) Filed: May 21, 2009

(65) Prior Publication Data
US 2010/0294628 A1 Nov. 25, 2010

(51) Int. Cl.
*B65G 29/00* (2006.01)
(52) U.S. Cl. .............................. 198/867.11; 198/803.14
(58) Field of Classification Search ............. 198/867.11, 198/867.12, 867.13, 803.14, 803.15
See application file for complete search history.

(56) References Cited

U.S. PATENT DOCUMENTS

| | | | | |
|---|---|---|---|---|
| 3,860,107 A | * | 1/1975 | Cioni et al. | 198/867.14 |
| 5,769,203 A | * | 6/1998 | Marti Sala | 198/803.14 |
| 5,799,934 A | * | 9/1998 | Kouda et al. | 198/803.14 |
| 6,176,369 B1 | * | 1/2001 | Petrovic | 198/867.11 |
| 6,971,506 B2 | * | 12/2005 | Hassinen et al. | 198/803.14 |
| 2002/0103573 A1 | | 8/2002 | Fellows et al. | |
| 2003/0176942 A1 | | 9/2003 | Sleep et al. | |

* cited by examiner

*Primary Examiner* — James R Bidwell
(74) *Attorney, Agent, or Firm* — Drinker Biddle & Reath LLP

(57) ABSTRACT

A reduced noise container carrier for an automated container filling machine has a container receptacle portion sized to receive a plurality of different sized containers; a side portion situated between the container receptacle portion and the bottom portion for engaging a plurality of mechanical devices of the machine; a substantially flat bottom portion for engaging a conveyor belt of the machine; an identification portion encoding an identification of the carrier; and, a noise reduction portion comprising a groove encircling the side portion of the carrier and a band disposed in the groove. The noise reduction portion is disposed to engage noise reduction portions of other carriers when the carriers collide on the conveyor belt and to avoid engaging portions of the machine other than the conveyor belt during a period of time when the machine is using the speed of the conveyor belt to calculate the position of the carrier.

13 Claims, 2 Drawing Sheets

REDUCED NOISE CONTAINER CARRIER

FIELD OF INVENTION

The present invention is directed to a container carrier for automated container filling machines.

BACKGROUND

Filling pharmaceutical prescriptions and non-drug product orders has traditionally been done one order at a time. For example, for prescriptions, a pharmacist takes the prescription (order) written by a medical doctor, and types out a label for a bottle (container), and counts out the correct number of pills (product) to fill the prescription and places the pills in the bottle. This method of filling orders is labor intensive and may be both expensive and prone to error. Some pharmacies such as Internet-based pharmacies need to fill many thousands of orders each day to keep up with the demand for orders. The traditional method of filling orders is inadequate for Internet-based pharmacies.

Automated container filling machines have been invented that automate the process of filing containers with a product. Some of the automated container filling machines are capable of filling many thousands of containers a day with product. The product may be prescription pills, non-drug products, liquids, pre-wrapped products, etc. Automated container filling machines typically use a conveyor belt that moves containers for the product to different stations for performing part of the order filling service such as dispensing the product or attaching a label to the container. Instead of placing containers (for example, a prescription bottle) directly on the conveyor belt, the containers may be transported by a container carrier that provides stability for the container and presents a standard size for the conveyor belt to process. Usually, a container carrier transported by the conveyor belt will move a single container from station to station for filling the order. For example, the container carrier may be transported to a labeling station that labels the container (for example a prescription label for a bottle) and associates the container carrier and the labeled container, and then to a dispensing station for dispensing the proper kind and number of product (for example pills) into the labeled container, and then to a station where a person (for example a pharmacist) quickly checks that the product matches the order, then to a station for putting a cap on the container, and finally to a station for collecting all the containers that belong to a single order for shipping.

A conveyor belt approach has proven successful as it permits flexibility in designing stations for performing services in filling the orders. For example, a conveyor belt approach permits a station to be added where the containers are filled by hand by a worker. This may be helpful because machines for dispensing the product may be expensive and limited in the number of different types of product that they can dispense and there may be many types of product that are rarely requested. So, it may be more cost effective to have a worker fill the order for some rarely requested product.

The conveyor belt approach may be difficult to implement without container carriers because some containers are fragile and tip over easily. The container carriers must be durable so that they can be used many thousands of times and physically manipulated by the automated container filling machine. For example, the automated container filling machine may need to pick up, push, shove, and stop container carriers while the conveyor belt continues to operate. When the container carriers are stopped a container carrier may collide with the container carrier in front of it and generate a lot of noise.

Further, the container carriers cannot be large as the automated prescription filling machine may need to be contained in a small space, and because larger container carriers would reduce the number of containers that could be filled in an hour. And, since workers may be part of a station for servicing a container carrier, the automated container filling machine needs to be quiet to provide a suitable work environment for the workers.

Thus there is a need in the art for a pill bottle transport carrier that is durable, capable of being physically manipulated by an automated container filling machine, relatively small in comparison to the size of the container, and that does not generate a lot of noise when colliding with other container carriers.

DETAILED DESCRIPTION

A reduced noise container carrier for an automated container filling machine is disclosed. The reduced noise container carrier comprises a container receptacle portion sized to receive a plurality of different sized containers and a side portion situated between the container receptacle portion and the bottom portion. The side portion is for engaging a plurality of mechanical devices of the machine. The carrier further includes a substantially flat bottom portion for engaging a conveyor belt of the machine; an identification portion encoding an identification of the carrier for the machine to identify the carrier; and a noise reduction portion comprising a groove encircling the side portion of the carrier and a band disposed in the groove. The noise reduction portion is disposed to engage noise reduction portions of other carriers when the carriers collide on the conveyor belt and to avoid engaging portions of the machine other than the conveyor belt during a period of time when the machine is using the speed of the conveyor belt to calculate the position of the carrier.

Figure 1:
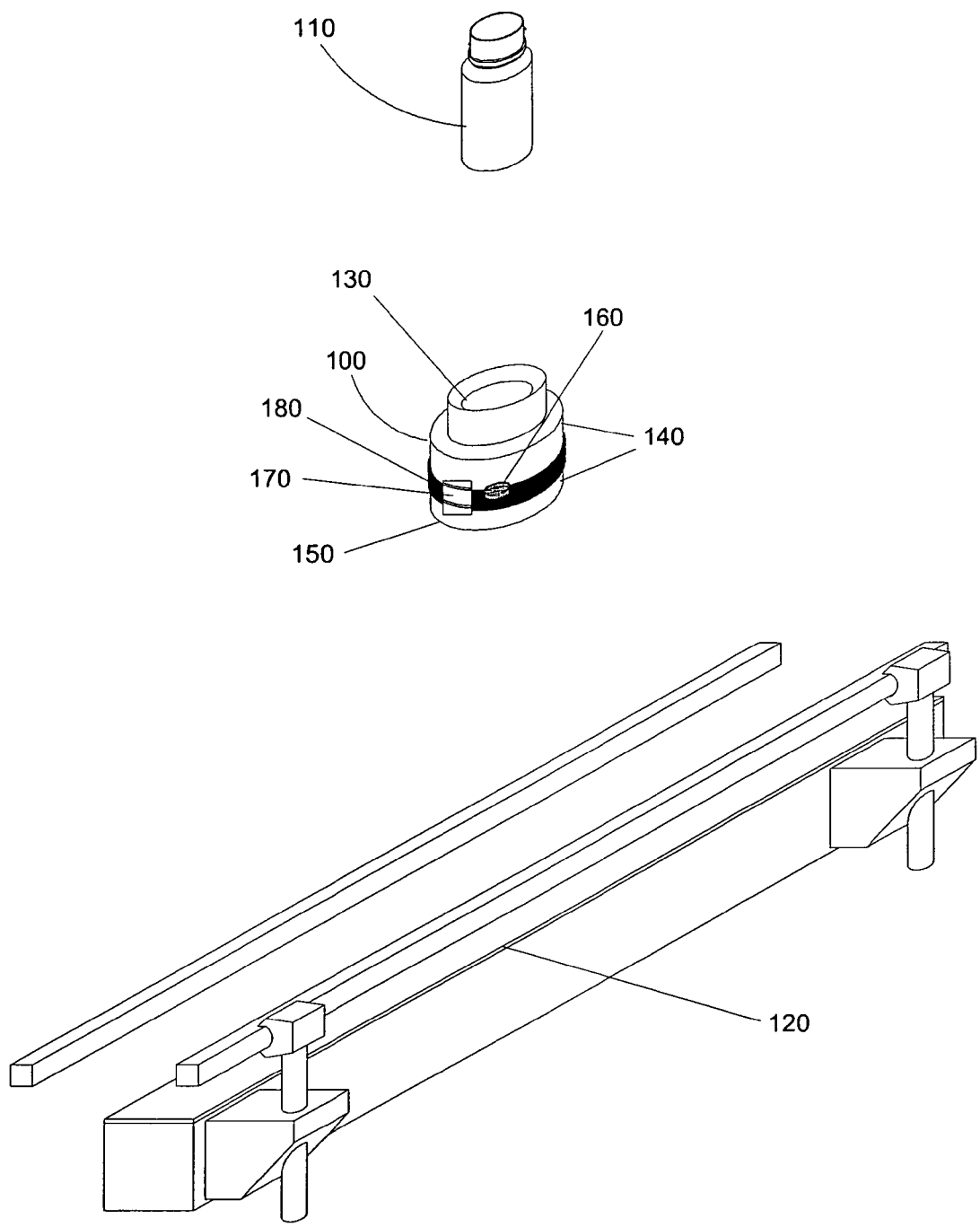
FIG. 1 illustrates a diagram of an example of an embodiment of a reduced noise container carrier.

FIG. 1 illustrates a diagram of an example of an embodiment of a reduced noise container carrier. The reduced noise container carrier 100 transports the container 110, illustrated here as a pill bottle 110, along the conveyor belt 120. The carrier 100 includes a container receptacle portion 130, a side portion 140, a bottom portion 150, an identification portion 160, and a noise reduction portion comprising a groove 170 and a band 180. The container receptacle portion 130 is sized to accommodate a plurality of sizes of containers 110. The diameter of the container receptacle portion 130 is greater than the container 110. The length of the container receptacle portion 130 may be shorter or longer than the container 110. The container 110 may extend over the container receptacle portion 130 or the container 110 may not extend over the container receptacle portion 130. The side portion 140 may be shaped to interact with the container filling machine (only the conveyor belt 120 of the container filling machine is illustrated in FIG. 1). For example, the side portion 140 may be smooth and flat to lower the friction between the side portion 140 and guard rails (not illustrated) when the carrier 100 rubs against the guide rails while being transported along the conveyor belt 120. The side portion 140 may be configured to accommodate the container filling machine picking up and putting down the carrier 100. For example, in embodiments the carrier 100 may have a lip that facilitates the picking up and putting down of the carrier 100.

The bottom portion 150 may be substantially flat for resting on the conveyor belt 120. The friction between the bottom portion 150 and the container filling machine needs to be balanced for two different states. A first state is a transporting state where the carrier 100 is being transported along the conveyer belt 120 where in general it is not desirable for the carrier 100 to slip so as to avoid the carrier 100 from unnecessarily colliding with the machine or other carriers. Additionally, the container filling machine may use the speed of the conveyer belt 120 to calculate a position of the carrier 100 and use this calculation to determine when to activate a mechanical device such as an arm to push the carrier 100 to a different conveyor belt 120. If the carrier 100 slips along the conveyor belt 120, then the calculation for when to activate the mechanical device will be incorrect. So, during this transport state, the friction needs to be great enough so that the carrier 100 is slip resistant.

During a second state, the machine holds the carriers 100 in a queue waiting to be serviced. In this queue state, the conveyor belt 120 continues to move and the carriers 100 are held back by a mechanical device such as an arm. The flow of the carriers 100 is stopped by the mechanical device and the carriers 100 hit the carrier 100 in front of it. These queues are needed because a station may not be ready to service a carrier 100. For example, a worker who manually fills containers with product may not be ready to pick up the carrier 100. The friction between the bottom 150 and the conveyor belt 120 cannot be so great as to place a large burden on a motor driving the convey belt 120 when many carriers 100 are being held in a queue.

The bottom portion 150 is configured to balance the needed amount of friction between the bottom portion 150 and the conveyor belt 120 for the transporting state so the container 100 will be slip resistant and the friction generated during a queue state so the container 100 will not place a large burden on a motor. Additionally, the bottom 150 is configured so that a great deal of excessive heat is not generated when the carrier 100 is being held in the queue state. In an embodiment, the bottom 150 may have grooves.

The carrier 100 includes an identification portion 160. The identification portion 160 may be an encoding of an identification for the carrier 100. For example, the identification portion 160 may be a bar code that the container filling machine reads to identify the carrier 100. Alternatively and/or in addition the identification portion 160 may be a number that the container filling machine reads and uses optical character recognition to identify the carrier 100. Alternatively and/or in addition, the carrier 100 may include a radio frequency identification 160 where the carrier 100 transmits the identification of the carrier 100, which is received by the container filing machine to identify the carrier 100.

The noise reduction portion comprises a groove 170 and a band 180. The placement and size of the groove 170 and band 180 and choice of material for the band 180 balances a number of design goals including: the band 180 reducing the noise during collisions of carriers 100 to provide an environment more amenable to workers, the band 180 being durable enough that the band 180 can stand up to thousands of collisions without needing maintenance, the band 180 being small enough so as not to significantly add to the overall diameter of the carrier 100, because a larger carrier 100 tends to slow the production rate, the band 180 being small enough and located in the proper part of the carrier 100 to enable a plurality of mechanical devices to engage the carrier 100 without engaging the band 180, and finally the band 180 not generating a lot friction between the band 180 and the machine during the transport state described above, so that the carrier 100 does not significantly slip during the transport state.

The larger the band 180 the easier it is to reduce the noise during a collision and the easier it is to make the band 180 durable. However, the larger the band 180 the larger the carrier 100 and the more likely the band 180 will strike the machine.

One embodiment that balances the design goals stated above is as follows. The groove 170 is milled out of the carrier 100. The groove 170 is $\frac{1}{16}$ of inch in width by $\frac{1}{2}$ of an inch in height with a length that goes all the way around the carrier 100. The groove 170 is $\frac{5}{8}$ of an inch from the bottom 150 of the carrier 100. The groove 170 accommodates the band 180. The height of the groove 170 from the bottom 150 is such that the band 180 is lower than guard rails that may run along the conveyor belt 120 so that the side 140 of the carrier 100 collides with or rubs the guard rails and not the band 170. The band 180 is $\frac{1}{8}$ of an inch in width by $\frac{1}{2}$ of an inch in height and with a length long enough to fit snuggly in the groove 170. The band 180 extends beyond the side 140 so that when two carriers 100 collide on the conveyor belt 120 the collision is usually between the bands 180 of the carriers 100.

This embodiment has the advantage that the band 180 is large enough so that the bands 180 strike and prevent the other parts of the carriers 100 from striking during collisions, which reduces the noise of collisions. This embodiment is durable at least because the band 180 is held in place by the groove 170. The size chosen in this embodiment does not significantly increase the overall size of the carriers 100 so that the throughput of the container filling machine is not substantially affected. The placement and size of the band 180 enables many mechanical devices to engage the carrier 100 without striking the band 180 and enables the carrier 100 to be transported along with conveyer belt 120 during the transport state described above without the band 180 generating friction between the band 180 and the container filling machine.

Additionally the band 180 may reduce the movement of the carriers 100 when two carriers 100 collide. Reducing the movement of the carriers 100 may reduce the chance that a carrier 100 will be knocked out of place on the conveyor belt 120. In an embodiment, the band 180 may be configured to collide with other carriers 100 and at least some of the mechanical devices of the container filling machine. For example, the band 180 may be designed to engage an arm (see FIG. 3) of the machine to further reduce the overall noise the container filling machine and carriers 100 generate.

The material used to construct the carrier 100 may be a thermoplastic polyethylene such as a ultra high molecular weight polyethylene (UHMWPE). For example, Neoprene™ may be used. The carrier 100 should be strong to withstand repeated use. The carrier 100 needs to be resistant to abrasion because the carrier 100 may rub against many parts of the automated pill bottle filling machine. The band 180 may be constructed of a durable material such as a polyolefin. The material used to construct the band 180 may have some elasticity to keep the band in place. The material used to construct the band 180 is chosen to balanced among the competing design goals as discussed above.

The container 110 may be a conventional or non-conventional container 110 that may be adapted for delivery of products such as pills, liquids, and/or pre-packaged products. The conveyor belt 120 may be a conventional conveyor belt 120 or a non-conventional conveyor belt 120 adapted to transport the carrier 100.

Figure 2:
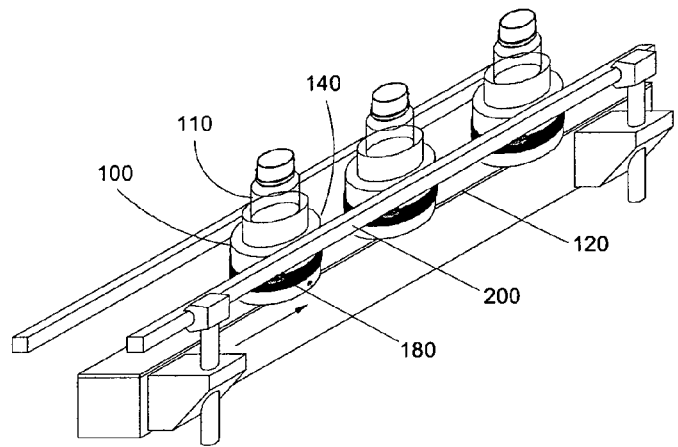
FIG. 2 illustrates a diagram of an example of an embodiment of a reduced noise container carrier being transported on a conveyor belt.

FIG. 2 illustrates a diagram of an example of an embodiment of a reduced noise container carrier being transported on a conveyor belt. The carriers 100 are being transported by the conveyor belt 120, and the carriers 100 are transporting pill bottles 110. The band 180 is configured so that the band 180 usually does not rub against the guard rails 200 of the container filling machine.

Figure 3:
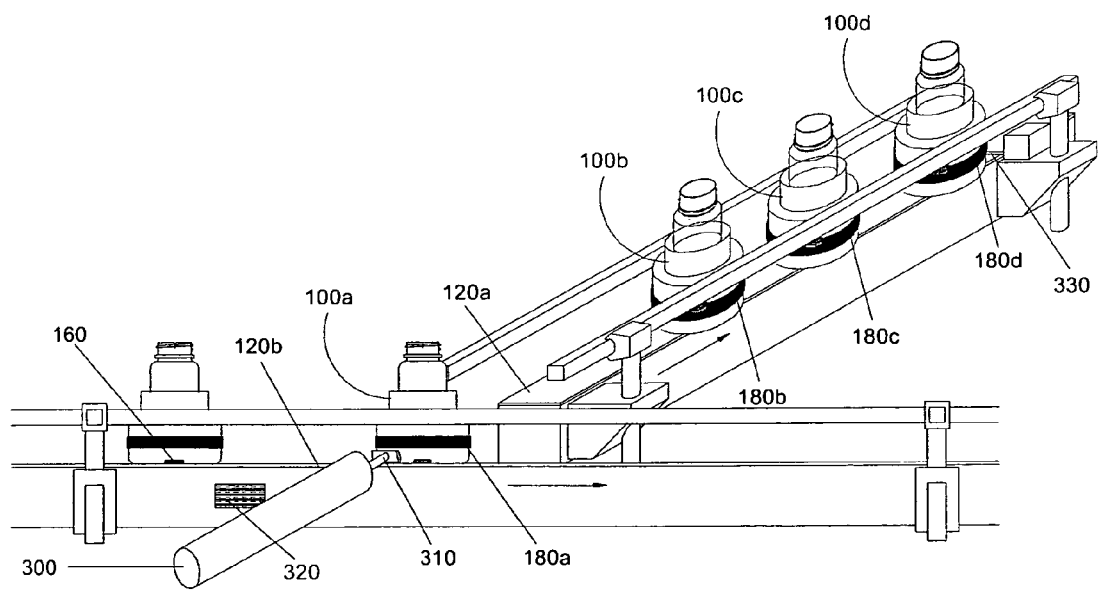
FIG. 3 illustrates a diagram of an example of an embodiment of a reduced noise container carrier being diverted from one conveyor belt to a second conveyor belt.

FIG. 3 illustrates a diagram of an example of an embodiment of a reduced noise container carrier being diverted from one conveyor belt to a second conveyor belt. The carrier 100a is being diverted to conveyor belt 120a from conveyor belt 120b. A pneumatic machine 300 is pushing the carrier 100a with an arm 310. The arm 310 may be one of many mechanical devices of the container filling machine that are used to manipulate the carrier 100. Other types of mechanical devices may be used to manipulate the carrier 100 such as grippers, shovers, and other conventional used mechanical devices. The band 180a of the carrier 100a is configured so that the arm 310 does not press on the band 180a. Additionally, carriers 100b, 100c, and 100d are in a queue awaiting service from a station (not illustrated). The carriers 100b, 100c, and 100d are being stopped by an arm 330 of the automated pill bottle filling machine. The conveyor belts 120a and 120b are continuing to operate. The carrier 100a is about to collide with carrier 100b. The collision will occur between the two bands 180a and 180b. The collision will produce less noise then if the carriers 100a and 100b collided without the bands 180a and 180b.

The container filling machine may have determined when to push the carrier 100a with the arm 310 as follows. A carrier identifier 320 may determine that a carrier 100a has passed the carrier identifier 320. This may be done by either scanning the identification portion 160 of the carrier 100a or receiving and identifying a transmitted signal from the identification portion 160 of the carrier 100a. The automated pill bottle filling machine may then determine when to push the carrier 100a with the arm 310 by calculating how long it will take the carrier 100a to be in front of the arm 310 based on a predetermined speed of the conveyor belt 120b. As discussed above for the "transporting state," because the container filling machine may use this method to determine when to push carriers 100, the friction between the carrier 100 and the conveyor belt 120b needs to be large enough so that the carrier 100 does not slip or the calculation for when to push the carrier 100 with the arm 310 may be incorrect, since it would take the carrier 100 longer to reach the arm 310.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

What is claimed is:

1. A reduced noise container carrier for an automated container filling machine, comprising:
   a container receptacle portion sized to receive a plurality of different sized containers;
   a substantially flat bottom portion for engaging a conveyor belt of the machine;
   a side portion situated between the container receptacle portion and the bottom portion, the side portion for engaging a plurality of mechanical devices of the machine;
   an identification portion encoding an identification of the carrier for the machine to identify the carrier;
   a noise reduction portion comprising a groove encircling the side portion of the carrier and a band disposed in the groove, the noise reduction portion disposed to engage noise reduction portions of other carriers when the carriers collide on the conveyor belt and to avoid engaging portions of the machine other than the conveyor belt during a period of time when the machine is using the speed of the conveyor belt to calculate the position of the carrier.

2. The reduced noise container carrier of claim 1, wherein the groove is sized at approximately 1/16 of an inch in width and approximately 1/2 of an inch in height.

3. The reduced container bottle carrier of claim 1, wherein the groove is at approximately 5/8 of an inch from the bottom portion.

4. The reduced noise container carrier of claim 1, wherein the band is approximately 1/8 of an inch in width and approximately 1/2 of an inch in height and long enough to snugly fit around the groove.

5. The reduced noise container carrier of claim 1, wherein the carrier is made from ultra high molecular weight polyethylene (UHMWPE).

6. The reduced noise container carrier of claim 1, wherein the carrier is made from Neoprene™.

7. The reduced noise container carrier of claim 1, wherein the carrier is milled to form the groove.

8. The reduced noise container carrier of claim 1, wherein the band is made from a polyolefin.

9. The reduced noise container carrier of claim 1, wherein rails of the automated container filling machine engage the side portion of the carrier at approximately 1 and 1/4 of an inch from the bottom portion.

10. The reduced noise container carrier of claim 1, wherein the bottom portion is configured so that when a line of carriers is stopped the drag due to friction on the conveyor belt is low and wherein the bottom portion is configured so the carrier is resistant to slip when the conveyor belt is transporting the carrier.

11. The reduced noise container carrier of claim 1, wherein the carrier and conveyor belt engage so that during transport of the carrier, the carrier is resistant to slip when moving with the conveyor belt so that the location of the carrier can be calculated based on an identification of the carrier location and a speed of the conveyor belt, and wherein during a queue operation where the carrier is being held from moving forward while the conveyer belt continues to move forward the drag generated due to the friction between the carrier and the moving conveyor belt is small so that many carriers may be held in a queue operation without creating a large drag on the motor driving the conveyor belt.

12. The reduced noise container carrier of claim 1, wherein the bottom portion is configured with ridges.

13. The reduced noise container carrier of claim 1, wherein the bottles are for filling prescriptions.

* * * * *